(12) United States Patent
Savage et al.

(10) Patent No.: US 8,372,360 B2
(45) Date of Patent: *Feb. 12, 2013

(54) CONTROLLED METAL LEACH RECOVERY CIRCUIT

(75) Inventors: Barbara J. Savage, Silver City, NM (US); David G. Meadows, Phoenix, AZ (US); Wayne W. Hazen, Lakewood, CO (US)

(73) Assignee: Freeport-McMoran Corporation, Phoeniz, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/188,231

(22) Filed: Jul. 21, 2011

(65) Prior Publication Data

US 2011/0277593 A1 Nov. 17, 2011

Related U.S. Application Data

(63) Continuation of application No. 11/856,605, filed on Sep. 17, 2007, now Pat. No. 8,003,064.

(51) Int. Cl.
*C22B 3/00* (2006.01)
(52) U.S. Cl. ............... 423/24; 423/8; 423/21.5; 423/22; 423/49; 423/54; 423/99; 423/139; 75/722
(58) Field of Classification Search .................... 423/24, 423/8, 21.5, 22, 49, 54, 99, 139; 75/722
See application file for complete search history.

(56) References Cited

U.S. PATENT DOCUMENTS

| | | |
|---|---|---|
| 1,614,669 A | 1/1927 | Greenawalt |
| 1,798,255 A | 3/1931 | Greenawalt |
| 1,808,547 A | 6/1931 | Greenawalt |
| 1,841,437 A | 1/1932 | Greenawalt |
| 3,528,784 A | 9/1970 | Green |
| 3,615,170 A | 10/1971 | Hazen et al. |
| 4,013,754 A | 3/1977 | Stauter et al. |
| 4,152,142 A | 5/1979 | Schlitt et al. |
| 4,338,168 A | 7/1982 | Stanley et al. |
| 4,526,215 A | 7/1985 | Harrison et al. |
| 4,582,689 A | 4/1986 | Kordosky |
| 4,666,512 A | 5/1987 | Hansen et al. |
| 4,957,714 A | 9/1990 | Olafson et al. |
| 5,356,457 A | 10/1994 | Pincheira et al. |
| 5,431,788 A | 7/1995 | Jones |

(Continued)

FOREIGN PATENT DOCUMENTS

| | | |
|---|---|---|
| EP | 1063307 | 12/2000 |
| JP | 2001239139 | 9/2001 |

(Continued)

OTHER PUBLICATIONS

International Search Report and Written Opinion from corresponding International Application No. PCT/US2008/075037 dated Dec. 10, 2008.

(Continued)

*Primary Examiner* — Steven Bos
(74) *Attorney, Agent, or Firm* — Snell & Wilmer L.L.P.

(57) ABSTRACT

The present invention relates generally to a process for controlled leaching and sequential recovery of two or more metals from metal-bearing materials. In one exemplary embodiment, recovery of metals from a leached metal-bearing material is controlled and improved by providing a high grade pregnant leach solution ("HGPLS") and a low grade pregnant leach solution ("LGPLS") to a single solution extraction plant comprising at least two solution extractor units, at least two stripping units, and, optionally, at least one wash stage.

16 Claims, 4 Drawing Sheets

U.S. PATENT DOCUMENTS

| | | | |
|---|---|---|---|
| 5,470,552 | A | 11/1995 | Kordosky et al. |
| 5,632,963 | A | 5/1997 | Schwab et al. |
| 5,645,708 | A | 7/1997 | Jones |
| 5,650,057 | A | 7/1997 | Jones |
| 5,869,012 | A | 2/1999 | Jones |
| 5,879,556 | A | 3/1999 | Hein |
| 5,902,474 | A | 5/1999 | Jones |
| 5,908,605 | A | 6/1999 | Virnig et al. |
| 5,919,674 | A | 7/1999 | Tunley |
| 5,976,218 | A | 11/1999 | Virnig et al. |
| 6,107,523 | A | 8/2000 | Virnig et al. |
| 6,171,564 | B1 | 1/2001 | Jones |
| 6,177,055 | B1 | 1/2001 | Virnig et al. |
| 6,242,625 | B1 | 6/2001 | Kordosky |
| 6,245,125 | B1 | 6/2001 | Dew et al. |
| RE37,251 | E | 7/2001 | Jones |
| 6,350,354 | B1 | 2/2002 | Neuman et al. |
| 6,395,062 | B2 | 5/2002 | Olafson et al. |
| 6,432,167 | B1 | 8/2002 | Virnig et al. |
| 6,455,019 | B2 | 9/2002 | Jones |
| 6,582,494 | B1 | 6/2003 | Dew et al. |
| 6,596,053 | B2 | 7/2003 | Virnig et al. |
| 6,599,414 | B1 | 7/2003 | Virnig et al. |
| 6,702,872 | B1 | 3/2004 | Virnig et al. |
| 6,726,887 | B1 | 4/2004 | Sugarman |
| 6,733,688 | B1 | 5/2004 | Sugarman et al. |
| 7,166,144 | B2 | 1/2007 | Hein et al. |
| 7,169,371 | B2 | 1/2007 | Jones |
| 7,214,256 | B2 | 5/2007 | Kordosky et al. |
| 7,309,474 | B2 | 12/2007 | Soderstrom |
| 7,390,468 | B2 | 6/2008 | Pekkala et al. |
| 8,003,064 | B2 * | 8/2011 | Savage et al. ............ 423/24 |
| 2004/0103756 | A1 * | 6/2004 | Kordosky et al. ............ 75/721 |
| 2004/0141896 | A1 | 7/2004 | Pekkala et al. |
| 2004/0228783 | A1 | 11/2004 | Harris et al. |
| 2004/0261579 | A1 * | 12/2004 | Hein et al. ............ 75/722 |
| 2005/0031512 | A1 | 2/2005 | Kordosky et al. |
| 2006/0088458 | A1 | 4/2006 | Kordosky et al. |
| 2006/0117908 | A1 | 6/2006 | Virnig et al. |
| 2009/0074639 | A1 | 3/2009 | Savage et al. |

FOREIGN PATENT DOCUMENTS

| | | |
|---|---|---|
| WO | WO0015857 | 3/2000 |
| WO | WO2006041695 | 4/2006 |

OTHER PUBLICATIONS

International Preliminary Report on Patentability from corresponding International Application No. PCT/US2008/075037, dated Apr. 1, 2010.

Non-Final Office Action from U.S. Appl. No. 11/856,605, dated Aug. 12, 2010.

Non-Final Office Action from U.S. Appl. No. 11/856,605, dated Nov. 19, 2010.

Examination Report from corresponding Australian Patent Application No. 2008302558, dated Sep. 17, 2010.

Examination Report from corresponding European Patent Application No. 08 832 712.7, dated Aug. 20, 2010.

Examination Report from corresponding European Patent Application No. 08 832 712.7, dated Jul. 4, 2011.

Anderson et al.; "Selection and Sizing of Copper Solvent Extraction and Electrowinning Equipment and Circuits"; Mineral Processing, 2002.

Owusu, George; "Selective Extraction of Copper from Acidic Zinc Sulfate Leach Solution Using LIX 622"; Hydrometallurgy, Jan. 1999, 51(1), pp. 1-8.

Kordosky, G.A.; "Copper Recovery Using Leach/Solvent Extraction/Electrowinning Technology: Forty Years of Innovation, 2.2 Million Tonnes of Copper Annually" The Journal of the South African Institute of Mining and Metallurgy, Nov./Dec. 2002, pp. 445-450.

Jergensen, Gerald V.; "Copper Leaching, Solvent Extraction, and Electrowinning Technology"; Society for Mining, Metallurgy, and Exploration, Inc.; 1999.

O'Brien, et al.; "Operational Changes at Phelps Dodge's Morenci Mine".

White, R. Hunter; "Morenci: Making the Most of a World Class Resource"; pp. 229-238.

Notice of Allowance from U.S. Appl. No. 11/856,605, dated Apr. 19, 2011.

Examination Report issued Nov. 15, 2011 in corresponding Chilean Patent Application No. 2712-2008 and machine translation of same in English.

U.S. Environmental Protection Agency; "Extraction and Beneficiation of Ores and Minerals"; Technical Resource Document, vol. 4 Copper, Aug. 1994, 363 pages.

Examination Report from corresponding Canadian Patent Application No. 2,699,893, dated Oct. 12, 2011.

Examination Report from corresponding Peruvian Patent Application No. 001618-2008, dated May 15, 2012 and machine translation of same in English.

Restriction Requirement from U.S. Appl. No. 13/331,699, dated May 10, 2012.

Non-Final Office Action from U.S. Appl. No. 13/331,699, dated Jul. 13, 2012.

Non-Final Office Action from U.S. Appl. No. 13/302,369, dated Apr. 3, 2012.

\* cited by examiner

CONTROLLED METAL LEACH RECOVERY CIRCUIT

CROSS REFERENCE TO RELATED APPLICATIONS

This application is a continuation of and claims priority to U.S. application Ser. No. 11/856,605, entitled "CONTROLLED COPPER LEACH RECOVERY CIRCUIT," which was filed on Sep. 17, 2007. The '605 application is hereby incorporated by reference herein in its entirety.

FIELD OF INVENTION

The present invention relates generally to a process for controlled leaching and sequential recovery of two or more metals from metal-bearing materials. In one exemplary embodiment, recovery of metals from a leached metal-bearing material is controlled and improved by providing a high grade pregnant leach solution ("HGPLS") and a low grade pregnant leach solution ("LGPLS") to a single solution extraction plant comprising at least two solution extractor units, at least two stripping units, and, optionally, at least one wash stage.

BACKGROUND OF THE INVENTION

Hydrometallurgical treatment of metal-bearing materials, such as metal ores, metal-bearing concentrates, and other metal-bearing substances, has been well established for many years. Moreover, leaching of metal-bearing materials is a fundamental process utilized to extract metals from metal-bearing materials. In general, the first step in this process is contacting the metal-bearing material with an aqueous solution containing a leaching agent or agents which extracts the metal or metals from the metal-bearing material into solution. For example, in copper leaching operations, especially copper from copper minerals, such as chalcopyrite, chalcocite, covellite, malachite, pseudomalachite, azurite, chrysocolla, and cuprite, sulfuric acid in an aqueous solution is contacted with copper-bearing ore. During the leaching process, acid in the leach solution may be consumed and various soluble components are dissolved thereby increasing the metal content of the aqueous solution. Other ions, such as iron may participate in the leaching of various minerals as these ions participate in dissolution reactions.

The aqueous leach solution containing the leached metal can then be treated via a known process referred to as solution extraction wherein the aqueous leach solution is contacted with an organic solution comprising a metal-specific extraction reagent, for example, an aldoxime and/or ketoxime or a mixture thereof. The metal-specific extraction reagent extracts the metal from the aqueous phase into the organic phase. Moreover, during the solution extraction process for copper and certain other metals, a leaching agent may be regenerated in the aqueous phase. In the case where sulfuric acid is the leaching agent, sulfuric acid is regenerated in the aqueous phase when copper is extracted into the organic phase by the extraction reagent. Iron ions, which should not be extracted by the metal-specific extraction reagent, should be recycled to the leaching step to the maximum extent possible.

In a standard agitation leaching process for copper, followed by solution extraction, the leach solution is diluted to a lesser or greater extent with acidified water in conjunction with the solid-liquid separation process needed to provide a clarified leach liquor and solid discharge. The diluted clarified leach solution then undergoes solution extraction wherein copper is removed from, and the sulfuric acid concentration is increased in, the aqueous phase. A portion of this copper-depleted, acid-containing aqueous phase, now called the raffinate, may be recycled back to the leaching process, recycled to the front of the solid-liquid separation process, and/or forwarded to secondary metal extraction processes, including but not limited to cobalt recovery.

However, under these current leaching and solution extraction processes, large concentrations of soluble metal and metal precipitate can be lost in the metal-depleted, acid-containing aqueous phase raffinate solutions. These losses lead to inefficiencies and low overall process yields. Additionally, these high metal concentrations in the raffinate make recovery of secondary metals costly and possibly impractical.

Accordingly, a process circuit for controlling the concentration of metal, especially copper, in the raffinate solution which is the feed for the subsequent recovery of secondary metals without negatively affecting the primary metal recovery circuit would be advantageous.

SUMMARY OF THE INVENTION

The present invention relates generally to a process for controlled leaching and sequential recovery of two or more metals from metal-bearing materials. In one exemplary embodiment, recovery of metals from a leached metal-bearing material is controlled and improved by providing a high grade pregnant leach solution ("HGPLS") and a low grade pregnant leach solution ("LGPLS") to a single solution extraction plant comprising at least two solution extractor units, at least two stripping units, and, optionally, at least one wash stage.

For example, in accordance with the various exemplary embodiments of the present invention, the present process comprises (a) providing a HGPLS to a solution extractor unit within a single solution extraction plant, (b) producing a high grade raffinate and a metal-loaded organic solution by contacting the HGPLS with a partially loaded organic solution in the solution extractor, (c) providing a LGPLS to a different solution extractor unit within the same solution extraction plant, and (d) producing a low grade raffinate and the partially loaded organic solution by contacting the LGPLS with a barren organic flow containing a metal-specific extraction reagent. Furthermore, in accordance with the various embodiments of the present invention, the flow rate and reagent concentration of the barren organic flow containing a metal-specific extraction reagent can be altered based on the incoming metal material quality to maintain a constant concentration of metal in the low grade raffinate, allowing for efficient secondary metal recovery, including but not limited to cobalt recovery. In accordance with an exemplary embodiment of the present invention, the concentration of metal in the LGPLS may be adjusted by blending a portion of the LGPLS with the high grade pregnant leach solution so that the quantity of metal entering the low grade extraction circuit remains substantially constant.

BRIEF DESCRIPTION OF THE DRAWING

A more complete understanding of the present invention, however, may best be obtained by referring to the detailed description when considered in connection with the drawing figures, wherein like numerals denote like elements and wherein.

DETAILED DESCRIPTION OF EXEMPLARY EMBODIMENTS

The detailed description of exemplary embodiments of the invention herein shows various exemplary embodiments and the best modes, known to the inventors at this time. These exemplary embodiments and modes are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent modes or embodiments that are known or obvious to those of reasonable skill in the art. Additionally, all included figures are non-limiting illustrations of the exemplary embodiments and modes, which similarly avail themselves to any equivalent modes or embodiments that are known or obvious to those of reasonable skill in the art.

Various embodiments of the present invention exhibit significant advancements over prior art processes, particularly with regard to metal recovery and process efficiency. Moreover, existing copper recovery processes that utilize a reactive process for metal recovery/solution extraction/electrowinning process sequence may, in many instances, be easily retrofitted to exploit the many commercial benefits the present invention provides.

Figure 1:
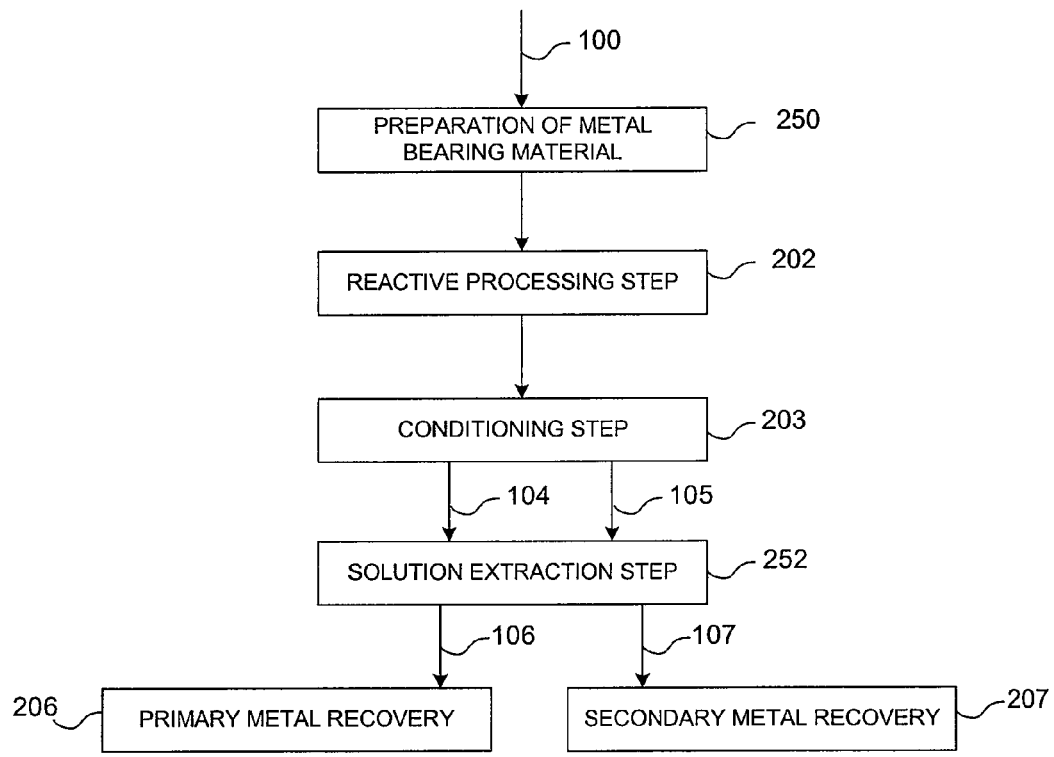
FIG. 1 illustrates a flow diagram of a general metal recovery process in accordance with the present invention.

Referring to FIG. 1, in accordance with various aspects of the present invention, a metal-bearing material 100 is provided for processing. Metal-bearing material 100 may be an ore, a concentrate, or any other material from which copper and/or other metal values may be recovered. Metal values such as, for example, copper, gold, silver, zinc, platinum group metals, nickel, cobalt, molybdenum, rhenium, uranium, rare earth metals, and the like, may be recovered from metal-bearing materials in accordance with various embodiments of the present invention. The various aspects and embodiments of the present invention, however, prove especially advantageous in connection with the recovery of copper from copper-bearing materials, such as, for example, ores and/or concentrates containing chalcopyrite ($CuFeS_2$), chalcocite ($Cu_2S$), bornite ($Cu_5FeS_4$), and covellite ($CuS$), malachite ($Cu_2CO_3(OH)_2$), pseudomalachite ($Cu_5[(OH)_2PO_4]_2$), azurite ($Cu_3(CO_3)_2(OH)_2$), chrysocolla ($(Cu,Al)_2H_2Si_2O_5(OH)_4.nH_2O$), cuprite ($Cu_2O$), brochanite ($CuSO_4.3Cu(OH)_2$), atacamite ($Cu_2[OH_3Cl]$) and other copper-bearing minerals or materials and mixtures thereof. Thus, metal-bearing material 100 preferably is a copper ore or concentrate containing at least one other metal value.

Metal-bearing material 100 may be prepared in preparation step 250 for metal recovery processing in any manner that enables the conditions of metal-bearing material 100—such as, for example, composition and component concentration—to be suitable for the chosen reactive processing method, as such conditions may affect the overall effectiveness and efficiency of metal recovery operations. Desired composition and component concentration parameters can be achieved through a variety of chemical and/or physical processing stages, the choice of which will depend upon the operating parameters of the chosen processing scheme, equipment cost and material specifications. For example, as discussed in some detail herein below, metal-bearing material 100 may undergo combination, flotation, blending, and/or slurry formation, as well as chemical and/or physical conditioning in preparation step 250 before metal extraction.

Referring again to FIG. 1, in an exemplary embodiment of the present invention, after metal-bearing material 100 has been suitably prepared in preparation step 250 for metal recovery processing, it may be forwarded to a reactive processing step 202, for example, metal extraction. The reactive processing step 202 may be any suitable process or reaction that puts a metal in the metal-bearing material 100 in a condition such that it may be subjected to later metal recovery processing. For example, exemplary suitable processes include reactive processes that tend to liberate the desired metal value or values in the metal bearing material 100 from the metal-bearing material 100. In accordance with a preferred embodiment of the present invention, as described in greater detail below, reactive processing step 202 may comprise a leaching process.

In one aspect of an exemplary embodiment of the present invention, conditioning of a metal-bearing solution after reactive process step 202 begins by adjusting certain physical parameters in conditioning step 203. For example, as discussed in some detail herein below, after reactive processing 202 metal-bearing material 100 may undergo reagent additions, flashing processes, one or more solid-liquid phase separation steps including use of filtration systems, counter-current decantation (CCD) circuits, thickeners, clarifiers, or any other suitable device for solid-liquid separation, in conditioning step 203 to prepare the metal solubilized therein for recovery.

Further, referring again to FIG. 1, in an exemplary embodiment of the present invention, after metal-bearing material 100 has been suitably conditioned in conditioning step(s) 203 it may be forwarded to solution extraction step 252. In accordance with further aspects of this exemplary embodiment, the conditioning step(s) 203 produces a high grade pregnant leach solution ("HGPLS") 104, comprising high concentrations of dissolved metal values, and a low grade pregnant leach solution ("LGPLS") 105, comprising a lower concentration of dissolved metal values than found in the HGPLS 104. In another exemplary embodiment, as discussed in some detail herein below, the HGPLS 104 and LGPLS 105 may be produced by separate reactive processing steps and/or separate conditioning steps.

Regardless of the reactive step which produces the HGPLS 104 and LGPLS 105, in an exemplary embodiment of the present invention, at least one HGPLS 104 stream and at least one LGPLS 105 stream is forwarded to solution extraction step 252. In accordance with an exemplary embodiment of the present invention, solution extraction step 204 comprises only one solution extraction plant. For example, in accordance with an exemplary embodiment of the present invention, solution extraction plant 204 may comprise multiple interconnected solution extraction trains within a single solution extraction plant 204. Generally, in accordance with the various embodiments of the present invention, the single solution extraction plant 204 is housed in one facility. It should be understood that this disclosure teaches, inter alia, efficient and controllable metal solution extraction from more than two separate pregnant leach solution ("PLS") feed streams containing two or more recoverable metal values in a single solution extraction plant and that any number of PLS streams are contemplated herein.

In contrast, the prior art teaches only multiple plant solution extraction for more than one PLS feed stream. It should be understood that any multiple plant solution extraction design requires roughly twice the equipment and capital cost in reference to a single solution extraction plant.

Moreover, in accordance with an exemplary embodiment of the present invention, single solution extraction plant 204 comprises at least two solution extractor units, at least two stripping units, and, optionally, at least one wash stage, which are housed in the same facility. It should be understood that this disclosure teaches, inter alia, any number of solution extractor units, any number of stripping units, and, optionally, any number of wash stages for processing any number of PLS streams are contemplated herein.

Generally, as will be described in greater detail below, in accordance with an exemplary embodiment of the present invention, LGPLS 105 is subjected to a solution extractor unit, wherein a barren organic flow containing a metal-specific extraction reagent extracts at least one metal value from the LGPLS 105 into the organic phase to form a partially loaded organic solution and a low grade raffinate 107. Additionally, in accordance with an exemplary embodiment of the present invention, HGPLS 104 is subjected to a different solution extractor unit within the same solution extraction plant 204, wherein the partially loaded organic solution further extracts at least one metal value from the HGPLS 104 into the organic phase to form a metal-loaded organic solution, rich electrolyte, 106, preferably containing a high concentration of primary metal values, and a high grade raffinate.

Further, referring again to FIG. 1, in an exemplary embodiment of the present invention, after solution extraction step 252, the resulting metal-loaded solution 106 may be forwarded to primary metal recovery, illustrated as step 206. In accordance with various aspects of the present invention primary metal recovery step 206 may be any metal recovery process, for example, electrowinning, sulphidation, precipitation, ion exchange or any other process suitable for recovery of metals, may be utilized. In an exemplary embodiment of the present invention metals to be recovered in primary metal recovery step 206 may include copper, silver, platinum group metals, molybdenum, zinc, nickel, cobalt, uranium, rhenium, rare earth metals, and the like. In a preferred exemplary embodiment of the present invention, primary recovery step preferably comprises an electrowinning circuit suitably designed to carry out any electrowinning process capable of producing a metal cathode product 208.

Similarly, referring again to FIG. 1, in an exemplary embodiment of the present invention, after solution extraction step 252, the resulting low grade raffinate 107 may be forwarded to one or more secondary metal recovery steps 207. In an exemplary embodiment of the present invention, additional electrowinning circuits may be employed in the secondary metal recovery step 207. Moreover, in an exemplary embodiment of the present invention, the secondary metal recovery step 207 may comprise any metal recovery process, for example, electrowinning, sulphidation, precipitation, ion exchange, cyanidation, or any other process suitable for recovery of secondary metals. Preferably, as discussed in some detail herein below, in an exemplary embodiment of the present invention, precipitation processes are used, thus making it advantageous to have low concentrations of primary metals in the low grade raffinate. Additionally, in an exemplary embodiment of the present invention, secondary metals to be recovered in secondary metal recovery step 207 may include, silver, platinum group metals, molybdenum, zinc, nickel, cobalt, uranium, rhenium, rare earth metals, and the like.

Figures 2A, 2B:
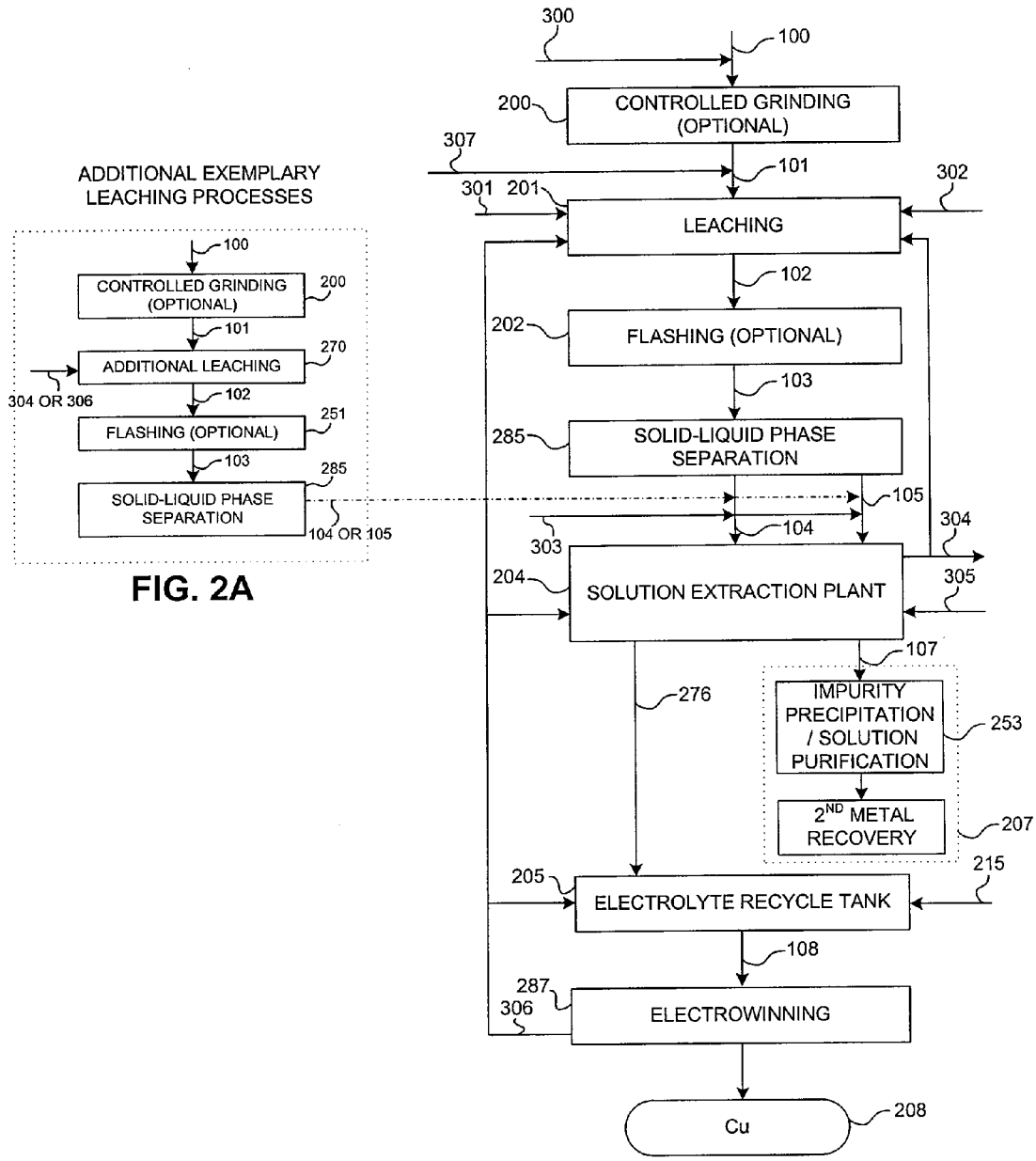
FIG. 2A illustrates a flow diagram of an alternate preparation process in accordance with the present invention.
FIG. 2B illustrates a flow diagram of an exemplary embodiment of a metal recovery process in accordance with the present invention.

Now with reference to FIG. 1 and FIG. 2B, in accordance with one aspect of the present invention, metal-bearing material 100 may optionally be prepared in a preparation step 250 comprising controlled grinding 200. More precisely, U.S. Pat. No. 6,676,909 describing controlled grinding is contemplated herein and the subject matter of that patent is hereby incorporated by reference. Preferably, a uniform particle size distribution is achieved. Additionally, process water 300 is preferably added to metal-bearing material stream 100 to bring the percent solids to the optimal pulp density specified for the controlled grinding unit 200. It should be understood that a variety of acceptable techniques and devices for reducing the particle size of the copper-bearing material are currently available, such as ball mills, tower mills, grinding mills, attrition mills, stirred mills, horizontal mills and the like, and additional techniques may later be developed that may achieve the desired result of reducing the particle size of the copper-bearing material to be transported.

Referring again to both FIG. 1 and FIG. 2B, in an exemplary embodiment of the present invention, after metal-bearing material 100 has been suitably prepared for metal recovery processing, optionally by controlled grinding 200, and other physical and/or chemical conditioning processes, including but not limited to a thickening process, it may be combined with any number of liquid feed stream, represented by numerical reference 307, to form a metal-bearing inlet stream 101. Preferably, in an exemplary embodiment of the present invention, the liquid feed stream 307 comprises process water, but any suitable liquid may be employed, such as, for example, recycled raffinate, pregnant leach solution, lean electrolyte, and/or other recycled streams from the metal recovery processes, including but not limited to secondary metal, such as cobalt or iron, recovery process streams.

Further, in an exemplary embodiment of the present invention, metal-bearing inlet stream 101 is subjected to a reactive processing step 202 (FIG. 1), for example, metal extraction. The reactive processing step 202 (FIG. 1) may be any suitable process or reaction that puts a metal in metal-bearing material 100 in a condition such that it may be subjected to later metal recovery processing. In accordance with one embodiment of the present invention, reactive processing step 202 (FIG. 1) comprises a leaching step 201 (FIG. 2B). Furthermore, in an exemplary embodiment of the present invention, the leaching process may comprise any leaching process suitable for extracting the metal in metal-bearing material 100 into an aqueous leach solution 102. In accordance with one aspect of the present invention, the leach step 201 comprises atmospheric leaching, pressure leaching, whole ore leaching, agitation leaching, heap leaching, stockpile leaching, pad leaching, thin-layer leaching and/or vat leaching, at either ambient or elevated temperatures. Preferably, pressure leaching 201 is a pressure leaching process operating at a temperature in the range of about 140° C. to about 250° C. and more preferably in the range of about 150° C. to about 220° C.

In accordance with an aspect of the present invention, the optimum temperature range selected for operation will tend to maximize the extraction of copper and other metals, minimize acid consumption, and thereby minimize make-up acid requirements. That is, at higher temperatures, sulfide sulfur generally is converted to sulfate according to the following reaction:

$$4CuFeS_2 + 17O_2 + 4H_2O \rightarrow 2Fe_2O_3 + 4Cu^{2+} + 8H^+ + 8SO_4^{2-} \qquad (1)$$

At lower temperatures, acid is generally consumed and elemental sulfur is formed according to the following reaction:

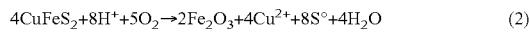

$$4CuFeS_2 + 8H^+ + 5O_2 \rightarrow 2Fe_2O_3 + 4Cu^{2+} + 8S° + 4H_2O \quad (2)$$

Thus, in accordance with one aspect of the present invention, in order to maintain preferable leaching temperature, a cooling liquid 301 may be introduced into the leaching vessel 201 during leaching. In accordance with one aspect of this embodiment of the present invention, a cooling liquid 301 is preferably contacted with the feed stream in leaching vessel 201 during leaching. Cooling liquid 301 may comprise make-up water, but can be any suitable cooling fluid from within the process or from an outside source, such as recycled liquid phase from the product slurry or a mixture of cooling fluids. Cooling liquid may be introduced into leaching vessel 201 through the same inlet as metal-bearing inlet stream 101, or in any manner that effectuates cooling of metal-bearing inlet stream 101. The amount of cooling liquid added during leaching may vary according to the pulp density of the metal-bearing inlet stream 101, as well as other parameters of the leaching process. In an exemplary aspect of this embodiment of the invention, a sufficient amount of cooling liquid 301 is added to leaching vessel 201 to yield a solids content in product slurry 102 on the order of less than about 50% solids by weight, more preferably ranging from about 3 to about 35% solids by weight, and most preferably ranging from about 10% to about 20% solids by weight.

Moreover, in accordance with one aspect of the present invention, leaching step 201 may occur in any pressure leaching vessel suitably designed to contain the pressure leaching mixture at the desired temperature and pressure conditions for the requisite pressure leaching residence time. In accordance with one aspect of an exemplary embodiment of the invention, the pressure leaching vessel used in leaching step 201 is an agitated, multi-compartment pressure leaching vessel. However, it should be appreciated that any pressure leaching vessel that suitably permits metal-bearing material 100 to be prepared for metal recovery may be utilized within the scope of the present invention.

During leaching step 201, copper and/or other metal values may be solubilized or otherwise liberated in preparation for later recovery processes. Any substance that assists in solubilizing the metal value, and thus releasing the metal value from a metal-bearing material, may be used. For example, where copper is the metal being recovered, an acid, such as sulfuric acid, may be contacted with the copper-bearing material such that the copper may be solubilized for later recovery steps. However, it should be appreciated that any suitable method of solubilizing metal values in preparation for later metal recovery steps may be utilized within the scope of this invention.

In accordance with one aspect of the present invention, during pressure leaching in leaching vessel 201, sufficient oxygen 302 is injected into the vessel to maintain an oxygen partial pressure from about 50 to about 200 psi, preferably from about 75 to about 750 psi and most preferably from about 100 to about 400 psi Furthermore, due to the nature of medium temperature pressure leaching, the total operating pressure in leaching vessel 201 is generally superatmospheric.

The residence time for the pressure leaching process can vary, depending on factors such as, for example, the characteristics of the copper-bearing material and the operating pressure and temperature of the pressure leaching vessel. In one aspect of an exemplary embodiment of the invention, the residence time for the pressure leaching ranges from about 30 to about 180 minutes, more preferably from about 60 to about 120 minutes.

Subsequent to metal-bearing material 100 undergoing leaching step 201, the metal values that have been made available by the leaching process undergo one or more of various conditioning steps 203 (FIG. 1). In one exemplary embodiment, the product stream 102 from leaching step 201 may be conditioned to adjust the composition, component concentrations, solids content, volume, temperature, pressure, and/or other physical and/or chemical parameters to desired values and thus to form a suitable metal-bearing solution. Generally, a properly conditioned metal-bearing solution will contain a relatively high concentration of soluble metal, for example, copper sulfate, in an acid solution and preferably will contain few impurities. Moreover, the conditions of the metal-bearing solution preferably are kept substantially constant to enhance the quality and uniformity of the copper product ultimately recovered.

In one aspect of an exemplary embodiment of the present invention, conditioning of a metal-bearing solution for metal recovery begins by adjusting certain physical parameters of the product slurry 102 from the leaching step 201. Optionally, in an exemplary aspect of this embodiment of the invention, wherein the leaching step 201 is pressure leaching, it is desirable to reduce the temperature and pressure of the product slurry, in some instances to approximately ambient conditions. An exemplary method of so adjusting the temperature and pressure characteristics of the product slurry is flashing 251 (FIG. 2B). In one aspect of an exemplary embodiment of the present invention, flashing step 251 (FIG. 2B) comprises atmospheric flashing. Further, flashed gases, solids, solutions, and steam may optionally be suitably treated, for example, by use of a Venturi scrubber wherein water may be recovered and hazardous materials may be prevented from entering the environment.

In accordance with further aspects of this exemplary embodiment, either the slurry product 102 directly from the leach process 201 or the flashed product slurry 103, if subjected to a flashing step 202 (FIG. 2B), may be further conditioned in preparation for later metal-value recovery steps. For example, one or more solid-liquid phase separation steps 285 (FIG. 2B) may be used to separate solubilized metal solution from solid particles. This may be accomplished in any conventional manner, including use of filtration systems, counter-current decantation (CCD) circuits, thickeners, clarifiers, and the like. A variety of factors, such as the process material balance, environmental regulations, residue composition, economic considerations, and the like, may affect the decision whether to employ a CCD circuit, a thickener, a filter, a clarifier, or any other suitable device in a solid-liquid separation apparatus. In one aspect of an exemplary embodiment of the invention, one or more solid-liquid phase separation steps 285 (FIG. 2B) may be carried out with a conventional CCD utilizing conventional countercurrent washing of the residue stream to recover leached metal values to one or more solution products and to minimize the amount of soluble metal values advancing with the solid residue to further metal recovery processes or storage.

In accordance with further aspects of this exemplary embodiment, as exemplified in FIG. 2B, the solid-liquid phase separation step 285 produces a high grade pregnant leach solution ("HGPLS") 104, comprising high concentrations of dissolved metal values, and a low grade pregnant leach solution ("LGPLS") 105, comprising a lower concentration of dissolved metal values than found in the HGPLS 104. Preferably, in accordance with further aspects of this exemplary embodiment, large wash ratios are utilized in the solid-liquid phase separation steps 285—that is, relatively large amounts of wash water are added to either the slurry product 102 or, if after the product slurry has been subjected to a flashing step 202, the flashed product slurry 103. This wash water collects the remaining dissolved metal values and thus becomes the LGPLS 105.

As further discussed herein below, the separated solids may further be subjected to later processing steps, including other metal recovery, such as, for example, recovery of gold, silver, platinum group metals, molybdenum, zinc, nickel, cobalt, uranium, rhenium, rare earth metals, and the like, by sulphidation, cyanidation, or other techniques. Alternatively, the separated solids may be subject to impoundment or disposal.

The liquid separated from a solid-liquid phase separation step 285 may also undergo a series of conditioning steps to prepare the metal solubilized therein for recovery. For example, the separated liquid may undergo various reagent additions to put the metal in a state such that the metal is susceptible to conventional metal recovery techniques. Further, subsequent conditioning and/or processing steps may be undertaken such that recovery rates are as efficient as possible.

Referring to FIG. 1 and FIG. 2B, in accordance with an exemplary embodiment of the present invention, after any desired conditioning steps 203 (FIG. 1), for example, addition of diluting solution 303, the HGPLS 104 and LGPLS 105 may be forwarded to the desired metal recovery step. The copper recovery step may include any suitable conditioning and/or copper recovery method or methods, for example, electrowinning, precipitation, solution extraction (sometimes referred to as solvent extraction or liquid ion exchange), ion exchange, and/or ion flotation, and preferably results in a relatively pure copper product. Additionally, in accordance with an exemplary embodiment of the present invention, diluting solution 303 may be any suitable liquid, for example, water or atmospheric leach effluent solution, that sufficiently reduces the copper and acid concentrations to desired levels to provide desirable equilibrium conditions for solution extraction 252. In accordance with an exemplary embodiment of the present invention, sufficient amount of diluting solution 303 is added to yield an acid concentration ranging from about 2 to about 25 grams/liter, and more preferably from about 4 to about 7 grams/liter and a pH preferably ranging from about pH 1.5 to about pH 2.5 and more preferably from about pH 1.8 to about pH 2.2, and optimally in the range of about pH 2.0. The HGPLS 104 and LGPLS 105 may thereafter be processed, such as for example in accordance with metal extraction by solution extraction 204.

In many instances, due to variation in incoming metal tenor in the metal-bearing material 100, it is advantageous to mix one or more leach solutions prior to solution extraction. As discussed briefly above, it is sometimes necessary to process two or more separate leach solution streams from multiple leach processes at one time. For example, if an operation has both a heap leach operation and a pressure or agitated leach operation, then the heap leach solution, equivalent to the LGPLS 105, may need to be processed with a more concentrated pregnant leach solution, HGPLS 104. In this instance, with reference to FIG. 2A and FIG. 2B and in accordance with an exemplary embodiment of the present invention, it is not required that the HGPLS 104 and LGPLS 105 are produced from the same leaching step 201, flashing step 202, and/or solid-liquid phase separation step 285. Stated another way, with reference to FIG. 2A and FIG. 2B and in accordance with an exemplary embodiment of the present invention, either the HGPLS 104 or the LGPLS 105 can be produced by one or more reactive processing steps 202. Additionally, with reference to FIG. 2A and FIG. 2B and in accordance with an exemplary embodiment of the present invention, multiple controlled grinding steps 200, flashing steps 202, and/or solid-liquid phase separation steps 285 can be utilized to produce either the HGPLS 104 or the LGPLS 105.

As mentioned above, the metal tenor in the metal-bearing material 100 can vary greatly over the course of operating a metal recovery plant. Due to this variation, both primary and secondary metal recovery processes can evidence losses in efficiency and overall processing yields. One reason for these losses is the inability to control and tune the metal tenor in the raffinate from solution extraction of the LGPLS extraction, low grade raffinate. For example, low grade raffinate is preferably subjected to a selective precipitation process wherein all metal ions except for those of the secondary metal to be recovered, for example cobalt, are eliminated from the process stream by precipitating them as solids. The precipitated primary metal solids may be recycled to the reactive step. These precipitated solids may have a high probability of being rendered unrecoverable depending on the precipitating mechanism employed. In the instance where there is high primary metal tenor in the low grade raffinate, the amount of precipitated primary metal solids recycled to the reactive step may increase. This increase in precipitated metal solids may lead to process inefficiencies due to high circulating loads in process steps 202 and 204 (FIG. 2B).

Similarly, the inability to control and tune the metal tenor in the low grade raffinate directly affects the costs associated with the secondary metal recovery processes. For instance, low metal tenors in the low grade raffinate require less reagent to effect precipitation (operating cost savings), thus smaller equipment can be used to recycle the copper precipitate (capital cost savings).

The present metal recovery process with single extraction plant advantageously allows for control and tuning of the low grade raffinate. Moreover, the solution extraction process 204, described in detail below, preferably, allows for control and tuning of the low grade raffinate by adjustment of the barren organic flow rate and/or adjustment of the reagent content and/or adjustment of the flow of the feed material and/or adjusting the metal content by blending or dilution, and/or any combinations thereof. It should be understood that any of these parameters or others may be advantageously adjusted or controlled as may be desired to suitably adjust the copper flux to the reactive process. Additionally, in accordance with an exemplary embodiment, the overall efficiency of the reactive process may be influenced by blending the primary metal solids precipitated from the low grade raffinate with high grade raffinate prior to recycling to the reactive process step.

By making any of these adjustments to control and tune the metal tenor in the low grade raffinate, the low grade raffinate should preferably contain very limited amounts of the primary metal and allows for efficient secondary metal processing. Additionally, the metal recovery process and solution extraction plant described below, allows plant operators to maintain a substantially controlled metal concentration in both the LGPLS stream and the low grade raffinate stream.

Generally, in accordance with exemplary embodiments of the present invention, the controllable process within solution extraction plant 204 comprises (a) providing a HGPLS to a solution extractor unit within a single solution extraction plant, (b) producing high grade raffinate and a metal-loaded organic solution by contacting the high grade leach solution with a partially loaded organic solution in the solution extractor, (c) providing a LGPLS to a different solution extractor unit within the same solution extraction plant, and (d) producing a low grade raffinate and the partially loaded organic solution by contacting the LGPLS with a barren organic flow containing a metal-specific extraction reagent.

As discussed above, in accordance with the various embodiments of the present invention, the flow rate and concentration of the barren organic flow containing a metal-specific extraction reagent can be altered based on the incoming metal ore quality to maintain a constant concentration of metal in the low grade raffinate, allowing for efficient secondary processing of other metals, including but not limited to cobalt recovery. Because both the HGPLS and LGPLS streams are treated in one facility, the metal content of the LGPLS may be controlled and held constant by adjusting LGPLS rate according to grade, with the excess being blended with the HGPLS.

Figure 3:
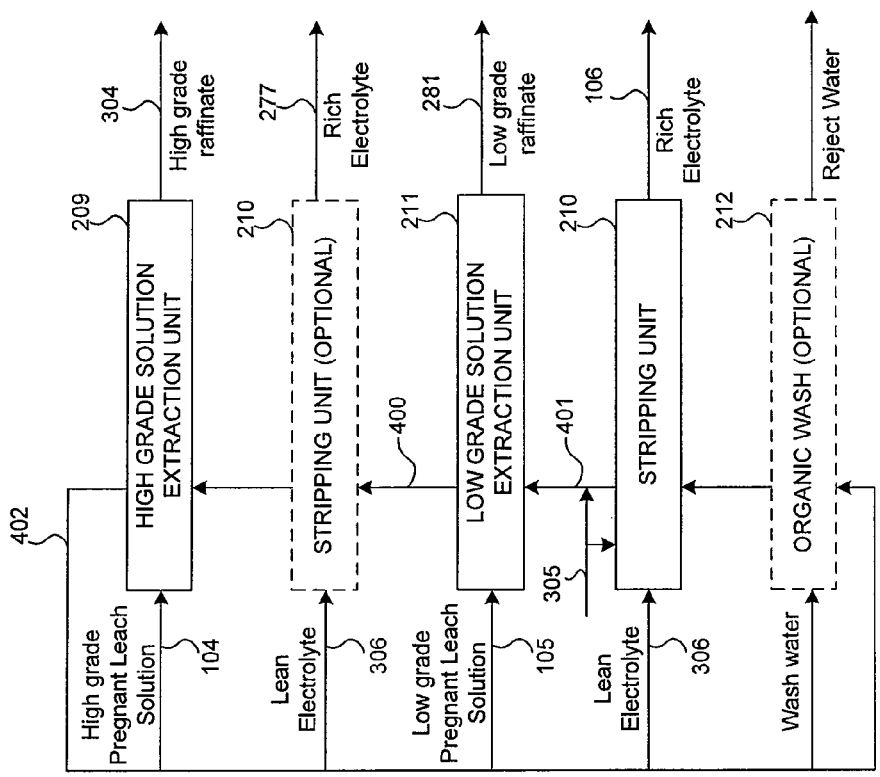
FIG. 3 illustrates a solution extraction process in accordance with the present invention.

In this regard, solution extraction plant 204 of FIG. 2 is described in greater detail in FIG. 3. In accordance with an exemplary embodiment of the present invention, with reference to FIG. 3, the HGPLS 104 is provided to a high grade solution extractor unit 209 and the LGPLS 105 is provided to a low grade solution extractor unit 211. In accordance with this exemplary embodiment of the present invention, HGPLS 104 has a greater concentration of metal than the LGPLS 105. In accordance with this exemplary embodiment of the present invention, the LGPLS 105 has a concentration of metal greater than about 20% of the concentration of metal in the HGPLS 104. Preferably, in accordance with this exemplary embodiment of the present invention, the LGPLS 105 has a concentration of metal greater than about 40% of the concentration of metal in the HGPLS 104. Most preferably, in accordance with this exemplary embodiment of the present invention, the LGPLS 105 has a concentration of metal greater than about 50% of the concentration of metal in the HGPLS 104.

As discussed briefly above, in accordance with exemplary embodiments of the present invention, the LGPLS 105 is contacted with a barren organic flow containing a metal-specific extraction reagent 401, for example, an aldoxime and/or ketoxime. The barren organic flow containing a metal-specific extraction reagent 401 extracts at least one primary metal value from the aqueous phase of the LGPLS 105 into the organic phase. In accordance with exemplary embodiments of the present invention, the metal-specific extraction reagent is supplied by external feed 305. More specifically, in accordance with another exemplary embodiment of the present invention, the LGPLS 105 is contacted with the barren organic flow 401 in low grade solution extractor unit 211. It should be understood that the solution extractor unit 211 is only an exemplary reference and may comprise multiple solution extractor units.

Further, in accordance with this exemplary embodiment of the present invention, upon extraction of the at least one primary metal value from the aqueous phase of the LGPLS 105, a low grade raffinate 281 and a partially loaded organic solution 400 are produced. In accordance with this exemplary embodiment of the present invention, low grade raffinate 281 is an aqueous stream containing at least one secondary metal values and containing very low primary metal tenor, thus the low grade raffinate is suitable for secondary metal recovery 207 as discussed above with reference to FIG. 1 and further exemplified in FIG. 2B.

Secondly, in accordance with this exemplary embodiment of the present invention, the partially loaded organic solution 400 may be contacted with the HGPLS 104 to produce a metal-loaded organic solution 402 and a high grade raffinate 304. Similarly, with reference to FIG. 3 and in accordance with exemplary embodiments of the present invention, the HGPLS 104 is contacted with the partially loaded organic solution 400 in high grade solution extractor unit 209. As will be discussed in detail below, in accordance with exemplary embodiments of the present invention, metal-loaded organic solution 402 is forwarded to at least one stripping unit 210 for recovery of at least one metal value. It should be understood that the solution extractor unit 209 is only an exemplary reference and may comprise multiple solution extractor units.

As discussed previously, it is desirable to produce a metal-loaded organic solution 402 with high metal tenor, which is suitably conditioned for metal recovery by stripping and electrowinning Additionally, it is desirable to produce a low grade raffinate 281, which contains very low primary metal tenor and is suitable for secondary metal extraction. In order to accomplish this, with reference to FIG. 3 and in accordance with exemplary embodiments of the present invention, the barren organic flow rate may be varied in correlation to the grade of the incoming metal-bearing material and may be produced in one or more stripping units 210. Additionally, in accordance with exemplary embodiments of the present invention, any metal-specific extraction reagent may be supplied by external feed 305 to the stripping units 210 or any time prior to contacting the LGPLS 105. In accordance with exemplary embodiments of the present invention, the concentration of the metal-specific extraction reagent 305 may be varied in correlation to the grade of the incoming metal-bearing material.

With reference to FIG. 3 and in accordance with exemplary embodiments of the present invention, the partially loaded organic solution 400 may be subjected to an optional stripping unit 210 prior to contacting the HGPLS 104. This intermediate optional stripping unit 210 may increase the extraction effectiveness of the organic solution 400, thereby allowing for a lower reagent concentration without sacrificing metal extraction efficiency. It should be understood that this disclosure teaches, inter alia, any number of solution extractor units and any number of stripping units in any configuration.

As mentioned above, in accordance with exemplary embodiments of the present invention, the metal-loaded organic solution 402, preferably containing a high metal tenor, is subjected to stripping unit 210 and at least one metal value is stripped from the metal-loaded organic solution 402. In accordance with exemplary embodiments of the present invention, at least one metal value is stripped from the metal-loaded organic solution 402 by using any fluid suitable for stripping metal values from a metal-loaded organic solution, preferably lean electrolyte 306 recycled from an electrowinning circuit 216 (FIG. 2B). Optionally, in accordance with exemplary embodiments of the present invention, the metal-loaded organic solution 402 is subjected to a wash stage 212 prior to being stripped in stripping unit 210.

High grade raffinate 304 from solution extraction plant 204 (FIG. 2B) may be used beneficially in a number of ways. For example, all or a portion of high grade raffinate 304 maybe recycled to any leaching step 201 for temperature control or may be used in atmospheric leaching, pressure leaching, whole ore leaching, agitation leaching, heap leaching, stockpile leaching, pad leaching, thin-layer leaching, vat leaching, and/or may be used for a combination thereof at either ambient or elevated temperatures. The use of high grade raffinate 304 in heap leaching operations may be beneficial because the acid and ferric iron values contained in raffinate 304 can act to optimize the potential for leaching oxide and/or sulfide ores that commonly dominate agitation leaching, heap leaching, stockpile leaching, pad leaching, thin-layer leaching and/ or vat leaching operations. That is, the ferric and acid concentrations of raffinate 304 may be used to optimize the Eh and pH of heap leaching operations. It should be appreciated that the properties of high grade raffinate 304, such as component concentrations, may be adjusted in accordance with the desired use of high grade raffinate 304.

Additionally, in accordance with the various embodiments of the present invention, low grade raffinate 107 from solution extraction plant 204 (FIG. 2B) may be sent to secondary metal processing 207 (FIG. 1) for other secondary metals, including, but not limited to silver, platinum group metals, molybdenum, zinc, nickel, cobalt, uranium, rhenium, rare earth and actinide metals. As mentioned above, preferred embodiments of the present invention advantageously provide for maintenance of a constant metal tenor in both the high grade and low grade raffinate. This direct control facilitates a known and substantially controlled metal precipitate recycle, increasing operating efficiency, potential limiting metal losses, and reducing recycle equipment size and subsequent capital costs. Therefore, in accordance with the various embodiments of the present invention, the flow rate and concentration of the organic flow containing a metal-specific extraction reagent 401 can be altered based on the incoming metal-bearing ore quality to maintain a constant concentration (tenor) of metal in the low grade raffinate 281. To effectuate such direct control either the metal concentration and/or flow rate of any organic and/or aqueous flow in the process may be controlled, thus enabling extraction to take place under tightly controlled conditions. Specifically, the amount of high grade raffinate which is recycled to a leach step may be controlled. This ability to maintain the metal tenor of the low grade raffinate 107 allows for the efficient recovery of cobalt or other secondary metal values at any given metallic ore quality by removing a majority of primary metals, which would interfere with the recovery of other secondary metal, from the low grade raffinate 107.

With reference to FIG. 3, the present invention allows the extraction circuit for the primary metal value to be tuned and optimized, both in terms of metallurgical performance and capital and operating costs. There is a trade off between achieving optimum metallurgical performance and minimizing the capital costs of the operating facility. The decisions made regarding this trade off are based on the performance and cost of the metal-specific extraction reagent employed as well as the chemistry of the pregnant leach solution streams to be treated. For example, the use of a metal-specific extraction reagent with exhibits rapid extraction kinetics may minimize the number of sequential extractors needed to achieve a satisfactory level of metal recovery. The presence of iron, manganese, or chloride in the pregnant leach solution streams may require the use of a wash stage prior to stripping. The number and placement of stripping units is decided based on the stripping kinetics of the extraction reagent as well as its maximum metal loading capacity. Accordingly, various configurations are within the scope of the present invention.

Moreover, in accordance with this exemplary embodiment of the present invention, multiple solution extractor units can be utilized in any configuration, preferably series or parallel configurations, within the same solution extraction plant 204. More specifically, the high grade solution extractor unit 209 is suitably connected in parallel to the low grade solution extractor unit 211 by a common organic flow containing a metal-specific extraction reagent. For example, in accordance with an exemplary embodiment of the present invention, as depicted in FIG. 4, low grade solution extractor unit 211 is separated from the high grade solution series solution extractor unit 209 by at least one serial solution extractor unit 213.

Additionally, the low grade solution extractor unit 211 is separated from the stripping unit 210 by at least on serial solution extractor unit 204.

Figure 4:
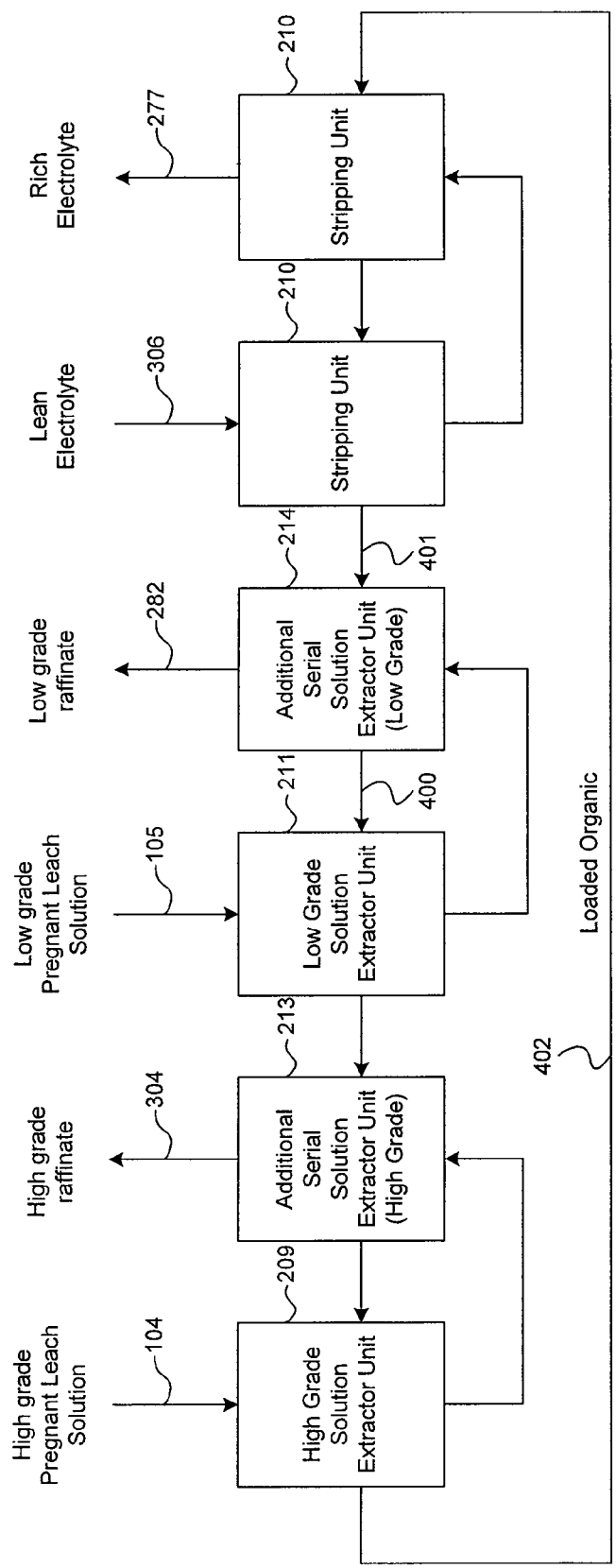
FIG. 4 illustrates one solution extraction plant for processing multiple leach solution streams in accordance with an exemplary embodiment of the present invention.

More precisely, with reference to FIG. 4 and the exemplary embodiment, the low grade solution extractor unit 211 and solution extractor unit 214 are in a series configuration. Additionally, the high grade solution extractor unit 209 and solution extractor unit 213 are in a series configuration. Moreover, it should be understood that it is not the number of solution extraction units employed, but the sequence in which they are configured, thus any number of solution extraction units can be employed and are contemplated herein. Further, as illustrated by FIG. 3, the high grade extractor units may optionally be separated from the low grade extractor units by an intermediate strip unit 210 (FIG. 3), if solution chemistry and process kinetics make it advantageous to do so. Additionally, an organic wash stage 212 (FIG. 3) may be added prior to stripping if necessitated by solution chemistry.

Returning to FIG. 2B, in accordance with the various embodiments of the present invention, metal-bearing solution stream, or rich electrolyte, 276 from solution extraction plant 204 may be sent to an electrolyte recycle tank 205. The electrolyte recycle tank may suitably facilitate process control for an electrowinning circuit 216, as will be discussed in greater detail below. Metal-bearing solution stream 276, which can contain from about 25 to about 75 grams/liter of copper and from about 145 to about 180 grams/liter acid, is preferably blended with a lean electrolyte 306 (i.e., electrolyte that has already been through the metal recovery phase and has had a portion of its dissolved copper removed) and makeup fluid 215, such as, for example, water, in the electrolyte recycle tank 205 at a ratio suitable to yield a product stream 108, the conditions of which may be chosen to optimize the resultant product of electrowinning step 216.

In accordance with the various embodiments of the present invention, the metal composition of product stream 108 is maintained substantially constant at a value from about 20 to about 60 grams/liter, more preferably at a value from about 30 to about 50 grams/liter. Metal values from the product stream 108 are removed during electrowinning circuit 216 to yield a pure, cathode metal product 217. As mentioned above, in accordance with the various embodiments of the present invention, electrowinning circuit 216 produces pure, cathode metal product 217 and lean electrolyte 306, which can be recycled to the electrolyte recycle tank 205, the solution extraction plant 204, and/or the leaching step 201.

It should be appreciated that in accordance with the various aspects of the invention, a process wherein, upon proper conditioning of the copper-bearing solution, a high quality, uniformly-plated cathode copper product may be realized without subjecting the copper-bearing solution to solution extraction prior to entering the electrowinning circuit is within the scope of the present invention. As previously noted, careful control of the conditions of the copper-bearing solution entering an electrowinning circuit—especially maintenance of a substantially constant copper composition in the stream—can enhance the quality of the electrowon copper by, among other things, enabling even plating of copper on the cathode and avoidance of surface porosity in the cathode copper, which degrades the copper product and thus diminishes its economic value. In accordance with this aspect of the invention, such process control can be accomplished using any of a variety of techniques and equipment configurations, so long as the chosen system and/or method maintain a sufficiently constant feed stream to the electrowinning circuit. As those skilled in the art are aware, a variety of methods and apparatus are available for the electrowinning of copper and other metal values, any of which may be suitable for use in accordance with the present invention, provided the requisite process parameters for the chosen method or apparatus are satisfied.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. The subject matter of the inventions includes all novel and non-obvious combinations and sub combinations of the various elements, features, functions and/or properties disclosed herein.

The method and system described herein may be implemented to recover copper and other metals in a controlled manner. Other advantages and features of the present systems and methods may be appreciated from the disclosure herein and the implementation of the method and system.

What is claimed is:

1. A method comprising:
producing a high grade pregnant leach solution and a low grade pregnant leach solution by subjecting a metal value containing product slurry to a solid-liquid separation process, wherein said low grade pregnant leach solution has a lower concentration of a metal value than said high grade pregnant leach solution;
subjecting said low grade pregnant leach solution to a solution extraction plant comprising at least two solution extractors and at least two stripping units to produce a low grade raffinate and a partially loaded organic solution; and
subjecting said high grade pregnant leach solution to said solution extraction plant to produce a high grade raffinate and a metal-loaded solution by contacting said high grade pregnant leach solution with said partially loaded organic solution.

2. The method of claim 1, further comprising creating said product slurry using a reactive process.

3. The method of claim 1, wherein said metal value is-stripped from said metal-loaded solution in at least one stripping unit.

4. The method of claim 3, wherein a barren organic solution is produced by at least one stripping unit.

5. The method of claim 2, wherein said reactive process is a leaching process.

6. The method of claim 5, wherein said high grade raffinate is recycled to said leaching process.

7. The method of claim 1, wherein said low grade raffinate comprises a secondary metal value.

8. The method of claim 7, wherein said low grade raffinate is subjected to secondary metal recovery processing.

9. The method of claim 7, wherein said secondary metal value is selected from the group consisting of gold, silver, platinum group metals, molybdenum, zinc, nickel, cobalt, uranium, rhenium, rare earth metals, and actinide metals.

10. A method comprising:
producing a low grade raffinate and a partially loaded organic solution in a first solution extractor unit by contacting a low grade pregnant leach solution with a barren organic solution;
producing a high grade raffinate and a metal-loaded organic solution in a second solution extractor unit by contacting a high grade pregnant leach solution with said partially loaded organic solution;
producing said barren organic solution by stripping a metal value from said metal-loaded organic solution in a stripping unit.

11. The method of claim 10, wherein said high grade pregnant leach solution has a greater concentration of a metal value than said low grade pregnant leach solution.

12. The method of claim 10, wherein said first solution extractor unit and said second solution extractor unit are in a solution extraction plant.

13. The method of claim 10, further comprising adding a metal-specific extraction reagent to said barren organic solution prior to contacting with said low grade pregnant leach solution.

14. The method of claim 10, wherein said high grade pregnant leach solution is generated from at least one of an atmospheric leaching process, a pressure leaching process, an agitation leaching process, a heap leaching process, a stockpile leaching process, a pad leaching process, a thin-layer leaching process, and a vat leaching process.

15. The method of claim 10, wherein said low grade raffinate is subjected to secondary metal recovery processing.

16. The method of claim 15, wherein the low grade raffinate comprises a secondary metal selected from the group consisting of silver, platinum group metals, molybdenum, zinc, nickel, cobalt, uranium, rhenium, rare earth metals, and actinide metals.

* * * * *